(12) United States Patent
Ruckstuhl

(10) Patent No.: US 7,739,946 B2
(45) Date of Patent: Jun. 22, 2010

(54) APPARATUS FOR BREWING COFFEE

(75) Inventor: Stephan Ruckstuhl, Neuendorf (CH)

(73) Assignee: Eldom Rothrist AG, Rothrist (CH)

( * ) Notice: Subject to any disclaimer, the term of this patent is extended or adjusted under 35 U.S.C. 154(b) by 1082 days.

(21) Appl. No.: 11/352,750

(22) Filed: Feb. 13, 2006

(65) Prior Publication Data

US 2007/0186781 A1 Aug. 16, 2007

(51) Int. Cl.
*A47J 31/24* (2006.01)
*A47J 31/46* (2006.01)

(52) U.S. Cl. .................. 99/302 P; 99/289 R; 99/302 R

(58) Field of Classification Search ............... 99/295, 99/298, 302 R, 302 P, 318, 289 R
See application file for complete search history.

(56) References Cited

U.S. PATENT DOCUMENTS

| 4,796,521 | A | * | 1/1989 | Grossi | 99/287 |
| 5,302,407 | A | | 4/1994 | Vetterli | |
| 6,021,706 | A | * | 2/2000 | Seguenot et al. | 99/319 |
| 6,192,786 | B1 | | 2/2001 | Gasser et al. | |
| RE37,173 | E | * | 5/2001 | Jefferson et al. | 99/299 |
| 6,634,280 | B2 | * | 10/2003 | Sowden et al. | 99/302 P |
| 6,857,355 | B2 | * | 2/2005 | Rolland | 99/302 R |
| 7,216,582 | B2 | * | 5/2007 | Yoakim et al. | 99/295 |
| 7,337,704 | B2 | * | 3/2008 | Hammad et al. | 99/281 |

FOREIGN PATENT DOCUMENTS

| EP | 0 097 129 A1 | 12/1983 |
| EP | 1 625 814 A1 | 2/2006 |
| FR | 2 766 346 A1 | 1/1999 |

* cited by examiner

*Primary Examiner*—Reginald L Alexander
(74) *Attorney, Agent, or Firm*—Sughrue Mion, PLLC

(57) ABSTRACT

An apparatus for brewing coffee, in particular for a coffee machine (1), comprises a brewing chamber (19) which is enclosed by a housing (10) and has a base (12) with an outflow (40) provided on one side and a nozzle assembly (8, 9, 11) provided on the opposite side, the nozzle assembly (8, 9, 11) comprising a nozzle (11) for supplying a fluid. The base (12) can be moved within the housing (10) and, depending on the degree to which the brewing chamber (19) is filled, the base (12) can be fixed in different positions for the brewing operation. It is thus possible for the apparatus for brewing coffee, while being of straightforward construction, to be adapted in a flexible manner to the desired quantity of coffee.

11 Claims, 5 Drawing Sheets

APPARATUS FOR BREWING COFFEE

FIELD OF THE INVENTION

The present invention relates to an apparatus for brewing coffee, in particular for a coffee machine, having a brewing chamber which is enclosed by a housing and has a base with an outflow provided on one side and a nozzle assembly provided on the opposite side, the nozzle assembly comprising a nozzle for supplying a fluid.

BACKGROUND OF THE INVENTION

There are coffee machines in which portion packs can be introduced into a holder, which can then be inserted into a closeable housing for a brewing operation. If a relatively large quantity of coffee is to be brewed, it is possible to insert another holder in order for two portion packs to be introduced. The disadvantage with this brewing apparatus is that different holders have to be used for different quantities of coffee or portion packs. This, on the one hand, involves laborious handling and, on the other hand, is inflexible since, depending on taste, finer apportioning of the quantity of coffee is desirable.

SUMMARY OF THE INVENTION

One of the objects of the present invention is thus to provide an apparatus for brewing coffee which is easy to handle and can flexibly accommodate different quantities of coffee or some other extraction substance.

This object is preferably achieved by an apparatus for brewing coffee which has the features of claim 1. According to the invention, the base can preferably be moved within the housing for the brewing chamber and, depending on the degree to which the brewing chamber is filled, can be fixed in different positions for the brewing operation. It is thus possible to adjust the quantity of coffee in the brewing chamber in accordance with requirements or taste, and there is no need for different components in order to change the volume of the brewing chamber.

According to a preferred embodiment of the invention, the position of the base in the housing can be adjusted via a mechanism. This means that handling is easy since the mechanism can be used to predetermine the position from the outside without any manual movement of the base.

In order for it also to be possible to execute a brewing operation under pressure in the brewing chamber, an all-round seal is preferably arranged between the base and housing. The seal here may be retained in a brewing position with a contact pressure between the base and housing, and the contact pressure can be reduced, or done away with altogether, for the movement of the base within the housing. This is because, for the brewing operation with a certain pressure of, for example, between 2 and 5 bar, it is necessary for the brewing chamber to be sealed, for which purpose the seal is retained with contact pressure between the base and housing. For the movement of the base, in contrast, it is disadvantageous if the contact pressure is still present, since this would just lead to wear of the seal and to high frictional forces.

For the movement of the base, it is therefore advantageous if the seal is guided smoothly in the housing. The seal may thus be movable relative to the base, and it is possible to produce a contact pressure between the seal and housing via wedge surfaces. This ensures that a contact pressure prevails merely in the fixed position of the base or in the brewing position.

For mechanical shifting of the arrangement of the seal on the base, the base is preferably mounted in a displaceable manner on a holder and has a wedge-shaped protrusion on the side which is directed away from the brewing chamber, it being possible for the outer wedge surface of this protrusion to be positioned against a sealing lip of the seal in order to produce the contact pressure. It is thus possible for the brewing chamber to be sealed straightforwardly using only a small number of components. On the side which is directed away from the base, the seal may be accommodated in a cutout on the holder, this acting as a type of stop in order for it also to be possible for the seal to be secured with clamping action between the holder and the base.

For easy handling, the apparatus has a switch in order for it to be possible to adjust the volume of the brewing chamber with respect to the thickness and the number of portion packs which are to be inserted. For coordination which is as flexible as possible, it is also possible to provide a metering device in order for it to be possible to adjust the quantity of water for the brewing operation. The consumer can thus make an individual adjustment in accordance with the strength and quantity of the coffee desired.

BRIEF DESCRIPTION OF THE DRAWINGS

The invention is explained in more detail hereinbelow by way of an exemplary embodiment (which shall not be construed to limit the scope of the invention as defined in the appended claims) and with reference to the attached drawings, in which:

DESCRIPTION OF EXAMPLE EMBODIMENTS

Figure 1:
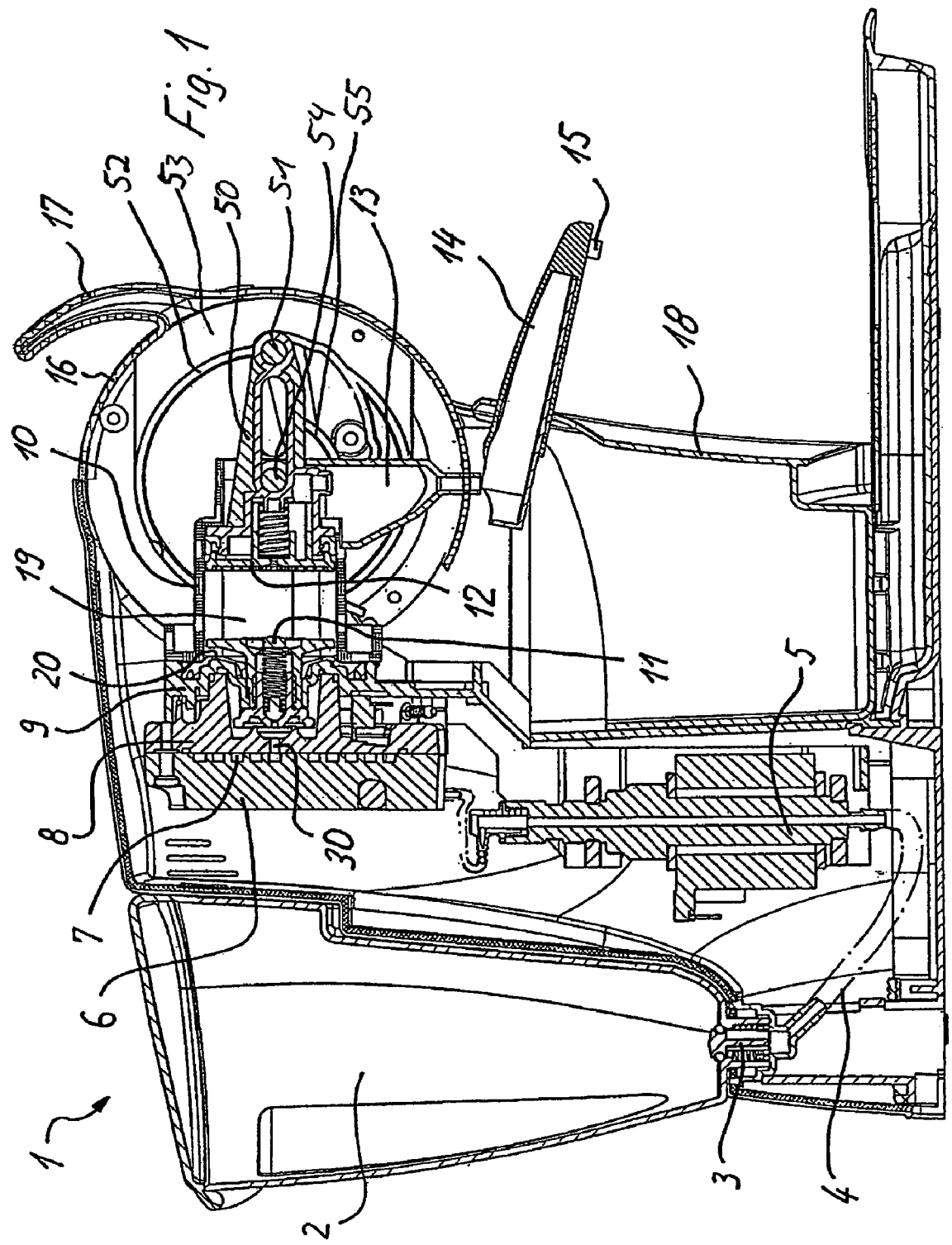
FIG. 1 shows a sectional side view of a coffee machine with an apparatus according to the invention for brewing coffee.

A coffee machine 1 has a storage container 2 for clean water, the storage container being connected to a pump 5 via an outlet valve 3 and a line 4. By means of the pump 5, the water can be led to a heating plate 6 which contains helical through-passages 7 in which the water can be heated. Provided alongside this is a plate 8 which forms part of a nozzle assembly and in which is provided a supply line 30 for the heated water. Installed on the plate 8 is a mount 9 for a sealing element 20 which is of essentially annular design and has a nozzle 11 provided in its center.

Via the nozzle 11, the heated water can flow into a brewing chamber 19 which is enclosed by a housing 10. Provided on the opposite side of the nozzle 11 is a base 12 which is intended for bounding the brewing chamber 19 and which contains an outflow, with the result that the fluid brewed flows through a funnel-like outlet 13 to an extension arm 14, on which an outlet opening 15 is provided for the purpose of filling coffee cups.

The coffee machine 1 comprises a brewing chamber 19 in which it is possible to insert one or more portion packs with coffee. Provided for this purpose is a cylindrical covering 16 on which is formed a handle 17, via which the housing 10 can be released from the nozzle assembly and pivoted via an actuating mechanism, with the result that the brewing chamber 19 is filled from above. The covering 16 is then closed and the housing 10 is moved into the position shown. Following the brewing operation, the portion packs are then emptied into a collecting container 18 in order for the brewing chamber 19 to be filled anew. For the coffee machine 1 shown, however, it is also possible to use other actuating mechanisms in order to fill the brewing apparatus with one or more portion packs.

Figure 2:
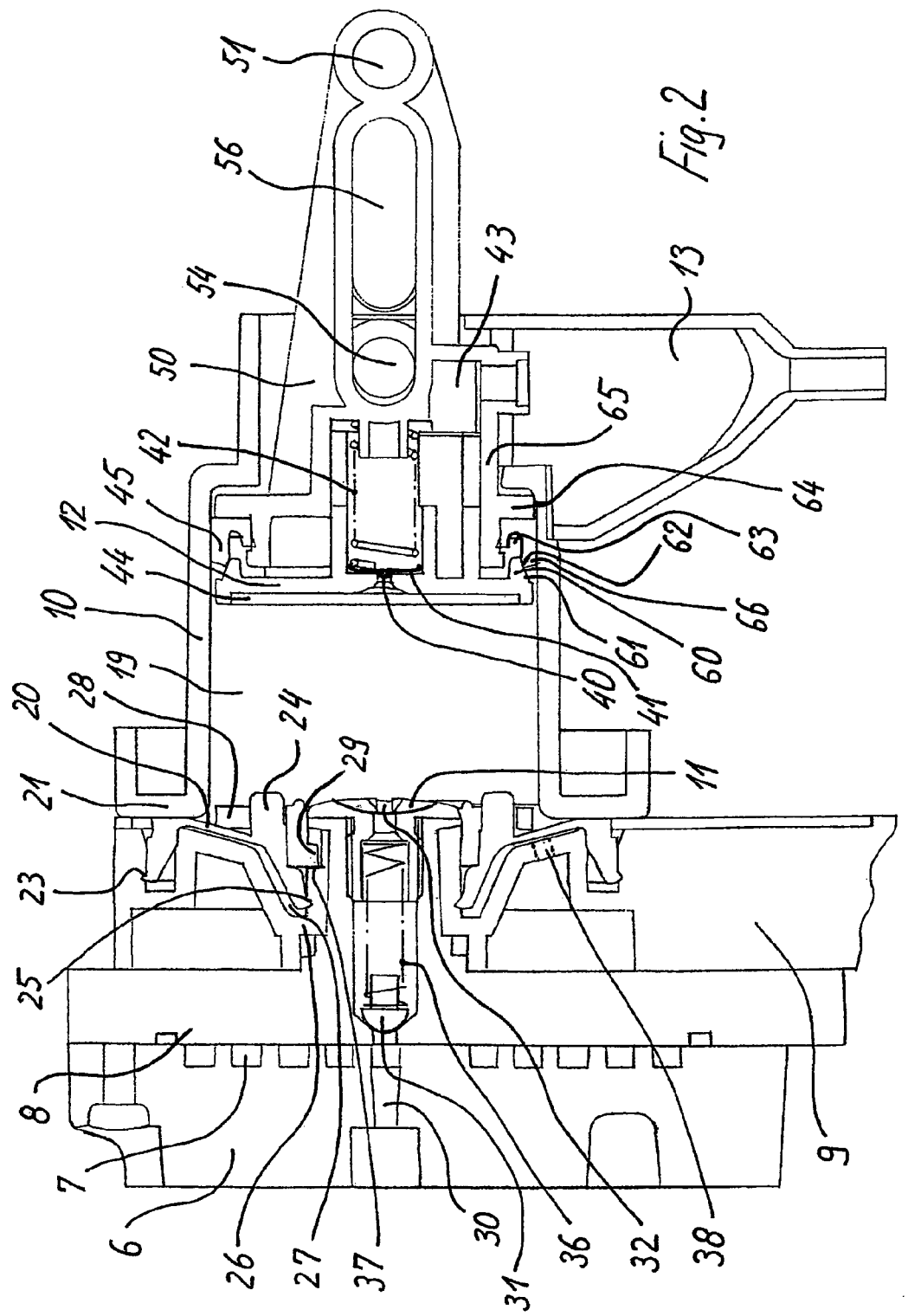
FIG. 2 shows an enlarged sectional side view of the apparatus from FIG. 1.

FIG. 2 illustrates the brewing apparatus of the coffee machine 1 in detail.

The sealing element 20 is of annular design and has an outer section on which are formed sealing lips 22 which butt against a radially outwardly projecting flange 21 of the housing 10. Also formed on the outer section of the seal 20 is a sealing surface 23 which ensures sealing between the holder 9 and the seal 20. Provided on an inner section of the seal 20 is a further sealing lip 25 for forming a sealing surface which butts against an annular section 26 of the holder 9. The holder 9 here is provided with an annular wall which is designed in a manner similar to the geometry of the seal 20. A pressure chamber 27 is thus formed between the wall of the holder 9 and the seal 20, and this pressure chamber is bounded by the sealing surface 23 on the outside and by the sealing surface 25 on the inside and can be subjected to pressure via a supply line 38. The supply line 38 is connected to the supply line 30 for supplying the heated water into the brewing chamber 19 and, for pressure-reducing purposes, preferably likewise has a valve with a spring, as is the case with the supply line 30.

Arranged on that side of the sealing element 20 which is directed toward the brewing chamber 19 is a plate-like pressure-exerting element 28, which is aligned by two pins 24 formed on the sealing element 20. The pressure-exerting element 28 has an inner cutout, in which the fixed nozzle 11 is accommodated. The pressure-exerting element 28 here has a protrusion 29 which can be moved maximally between the nozzle 11 and a stop 37 on the holder 9. The pressure-exerting element 28 is arranged in a displaceable manner in this region and can be moved correspondingly into the brewing chamber 19.

Once the fluid has been heated, it can flow through a supply line 30 which is closed by a prestressed valve 31. For this purpose, a spring 36 is arranged between the valve body 31 and the nozzle 11. The nozzle 11 is screw-connected to a sleeve-like protrusion of the plate 8 and has an opening 32 which opens out into the brewing chamber 19.

On the opposite side of the nozzle 11, a base 12 is provided on the brewing chamber 19, this base having a plurality of ribs 44 and a central outflow 40. The outflow 40 is closed via a valve body 41, which is prestressed into the closed position via a spring 42. This ensures that, within the brewing chamber 19, the fluid can be led away via an outflow channel 43 only when a certain pressure is exceeded.

The base 12 is mounted on a holder 50 which is coupled to a pin 51. The pin 51 is retained in a curved element 52 of a curved guide 53, with the result that, in the case of movement of the actuating element 17, the curved guide 53 is moved and, via the pin 51, the holder 50 is displaced together with the base 12 within the housing 10. The holder 50 also has a slot 56 through which leads a further pin 54 as a fulcrum for the housing 10 and central mounting for the curved guide 53, on which a further curved element 55 is formed. Pivoting of the actuating element 17 thus allows, on the one hand, pivoting of the base 12 in the housing 10 and, on the other hand, pivoting of the housing 10 itself for filling purposes, the brewing chamber 19 then having an upwardly directed opening into which one or more portion packs can be inserted. The actuating element 17 is then pivoted back again and the brewing chamber 19 assumes the position shown in FIG. 1 or 2, and the base 12 is adjusted automatically to the brewing-chamber height corresponding to the portion packs introduced.

Arranged alongside this on the base 12 is a seal 45 which has a sealing lip 66 which butts only lightly against the housing 10, with the result that the base 12 can be displaced smoothly. For the brewing operation, however, the seal 45 has to be accommodated with a contact pressure in the housing 10, in order for it to be possible for a pressure of, for example, between 2 and 5 bar to build up in the brewing chamber 19. For this purpose, on the side which is directed away from the brewing chamber 19, the base 12 has an all-round protrusion 60 which is of wedge-shaped design in cross section and has an outer wedge surface 61 which can be positioned against the sealing lip 66. The sealing lip 66 likewise has, in the front region, a slope 62, which can be positioned against the wedge surface 61. The seal 45 is of cross-sectionally U-shaped design and has an accommodating means 63 for the protrusion 60 and, on the opposite side, butts against a ring 64 on a sleeve-like section 65 of the holder 50.

As long as the spring-assisted spacing between the base 12 and seal 45 is present, the base 12 can be displaced smoothly in the housing 10. For the brewing operation, the base 12 is positioned in a form-fitting manner against the portion packs, but may also be forced against the same with light contact pressure, with the result that the base 12 moves in relation to the seal 45. By virtue of this movement, the wedge surface 61 forces the sealing lip 66 outward and ensures reliable sealing. The contact-pressure force is increased further if, upon initiation of the brewing operation, the pressure-exerting element 28 is forced, by the build-up of pressure in the pressure chamber 27, against the portion packs, which then, in turn, force the base 12 against the seal 45. This achieves, on the one hand, good sealing of the brewing chamber 19 and, on the other hand, a high level of tolerance in respect of the quantity of coffee.

Figure 3:
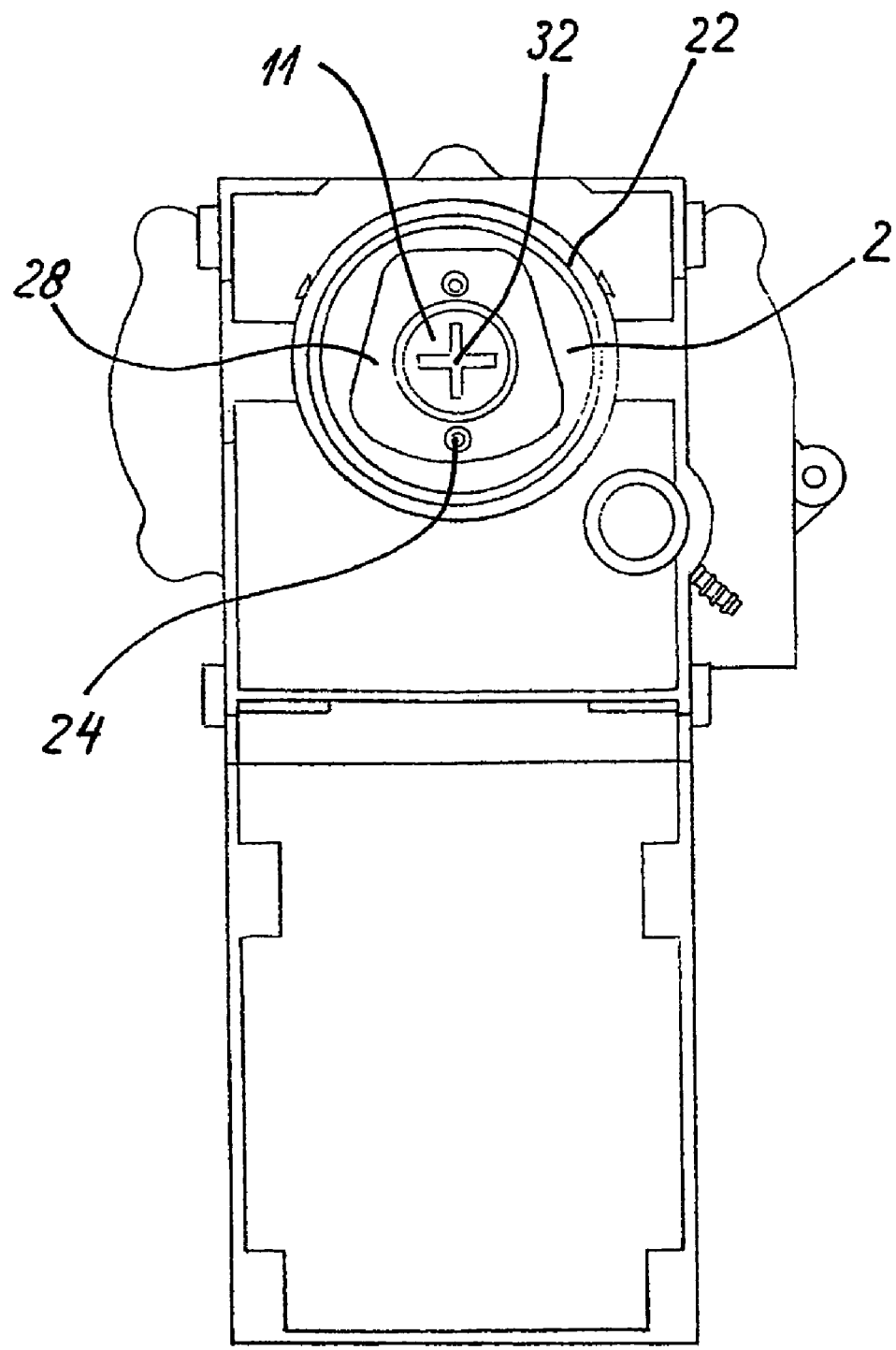
FIG. 3 shows a plan view of the nozzle assembly of the brewing chamber from FIG. 2.

FIG. 3 shows the nozzle 11 in plan view, from which the cross-shaped outlet opening 32 is visible. The nozzle 11 is accommodated within the pressure-exerting element 28, which is retained in a centered manner via pins 24 and butts against the seal 20 on the rear side. The sealing lips 22 are of circular design and butt against the housing 10.

Figure 4:
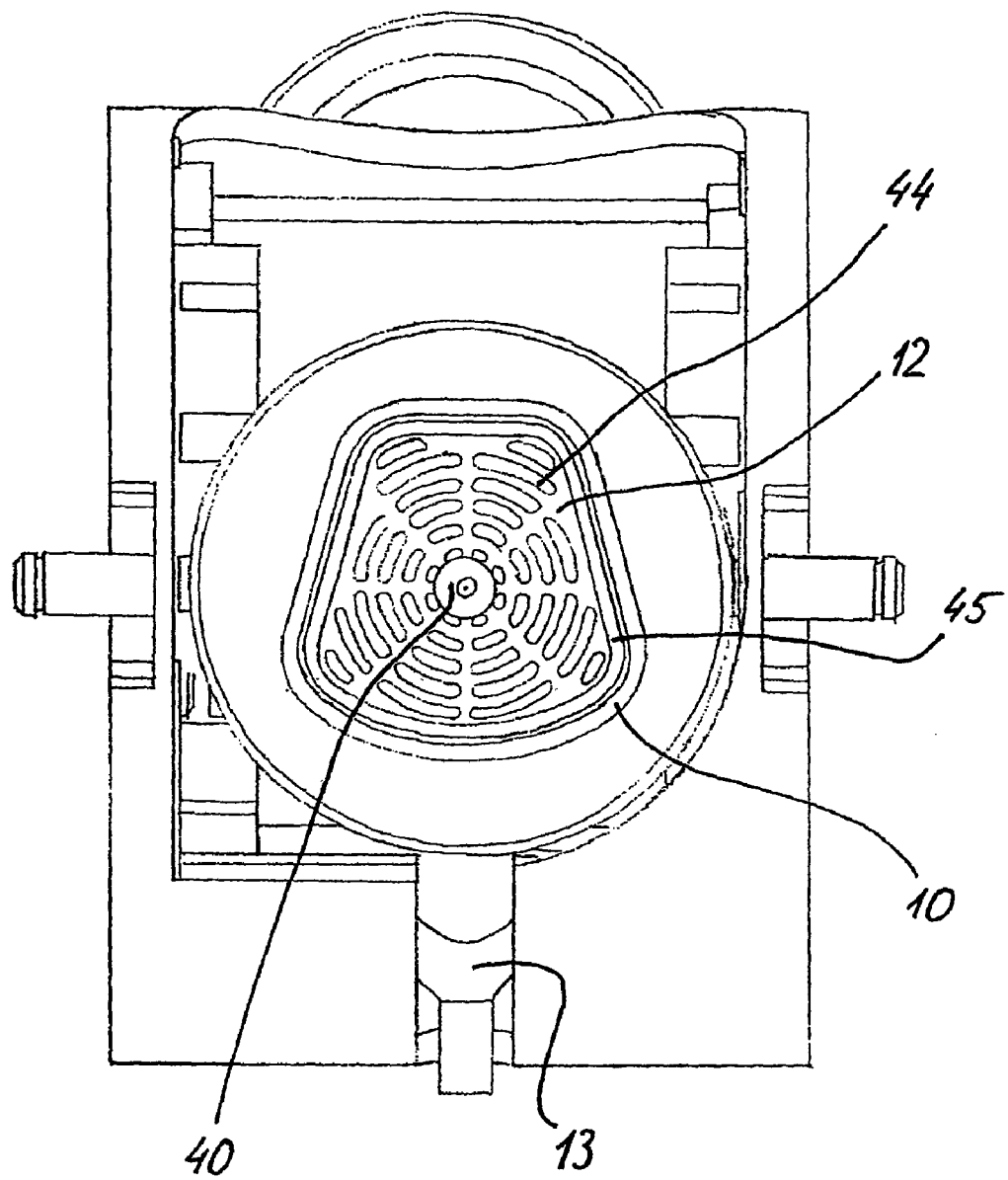
FIG. 4 shows a plan view of the base of the brewing chamber from FIG. 2.

FIG. 4 illustrates the base 12 of the brewing chamber 19. The ribs 44 ensure a spacing between the portion packs within the brewing chamber 19 and a base surface, with the result that the fluid can be led to the outflow 40. The base 44 is sealed on the periphery via a seal 45.

Figure 5:
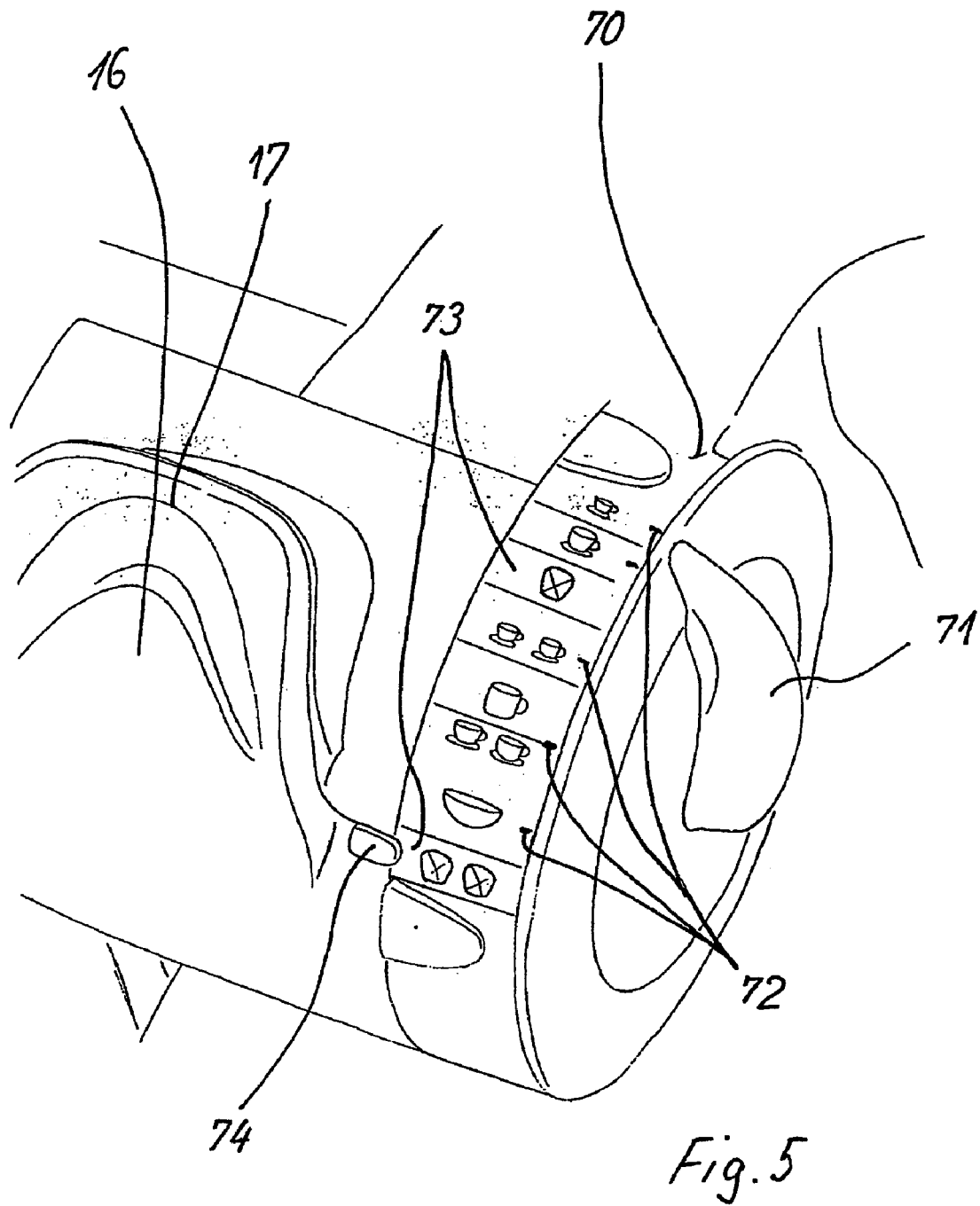
FIG. 5 shows a perspective view of the adjusting mechanism for the brewing chamber.

FIG. 5 shows the adjusting mechanism on the coffee machine 1. A housing ring 70 is provided with markings 72 which indicate symbolically the quantity of water required. A lever 71 can be used to adjust the desired quantity of water by way of the markings 72, with the result that the pump 5 correspondingly provides just the desired volume of water.

Furthermore, a marking 74 is located on the cylindrical covering 16 and, when the brewing assembly is closed by way of the actuating element 17, this marking indicates, via markings 73 and the housing ring 70, how many portion packs have been introduced. The markings 73 denote one or two portion packs. The user can thus freely select the quantity of coffee which is to be brewed in the brewing chamber 19. It is, of course, also possible to provide for a finer adjustment of the size of the brewing chamber 19, for example if there are portion packs of different thicknesses which, in accordance with the coffee taste, contain different quantities of coffee powder. In addition, it is also possible to introduce more than two portion packs into the brewing chamber 19.

It is, of course, also possible for the adjusting mechanism for apportioning the quantity of coffee and for metering the water to be designed differently and to have, for example, stepless adjustment with a quantity indicator.

The invention claimed is:

1. An apparatus for brewing coffee, in particular for a coffee machine, having a brewing chamber which is enclosed by a housing and has a base with an outflow provided on one side and a nozzle assembly provided on the opposite side, the nozzle assembly comprising a nozzle for supplying a fluid, wherein the base can be moved within the housing and, depending on the degree to which the brewing chamber is filled, can be fixed in different positions for the brewing operation, wherein the base is mounted in a displaceable manner on a holder and has a wedge-shaped protrusion on the side which is directed away from the brewing chamber, and wherein an all-round seal is arranged between the base and housing, the seal being retained in a brewing position with a contact pressure between the base and housing, it being possible for the outer wedge surface of this protrusion to be positioned against a sealing lip of the seal in order to produce the contact pressure.

2. The apparatus as claimed in claim 1, wherein the position of the base in the housing can be adjusted automatically via a mechanism.

3. The apparatus as claimed in claim 1, wherein an all-round seal is arranged between the base and housing.

4. The apparatus as claimed in claim 3, wherein the seal is retained in a brewing position with a contact pressure between the base and housing, and the contact pressure is at least reduced for the movement of the base within the housing, the seal only butting lightly against the housing for the movement of the base.

5. The apparatus as claimed in claim 4, wherein the seal is movable relative to the base, and it is possible to produce a contact pressure between the seal and housing via wedge surfaces.

6. The apparatus as claimed in claim 1, wherein, on the side which is directed away from the base, the seal is accommodated in a cutout on a holder.

7. The apparatus as claimed in claim 1, wherein the nozzle assembly has a pressure-exerting element which, upon initiation of the brewing operation, can be moved hydraulically in the direction of the brewing chamber, portion packs contained in the brewing chamber thus being forced in the direction of the base.

8. The apparatus as claimed in claim 1, wherein a marking is provided in order to indicate the volume of the brewing chamber with respect to the thickness and the number of portion packs inserted.

9. The apparatus as claimed in claim 1, wherein a metering device is provided in order for it to be possible to adjust the quantity of water for the brewing operation.

10. The apparatus as claimed in claim 6, wherein a spring is provided between the base and the holder in order to subject a seal to stressing by a movement of the base relative to the holder.

11. The apparatus as claimed in claim 2, wherein the base can be automatically fixed in different positions, without any preliminary adjustment, within the housing for the brewing operation via curved elements, levers, guide means or other mechanisms.

* * * * *